(12) United States Patent
Low et al.

(10) Patent No.: US 11,777,724 B2
(45) Date of Patent: Oct. 3, 2023

(54) DATA FRAGMENTATION AND RECONSTRUCTION

(71) Applicant: Verizon Patent and Licensing Inc., Basking Ridge, NJ (US)

(72) Inventors: Mun Wei Low, Irving, TX (US); Manuel Enrique Caceres, Basking Ridge, NJ (US); Stuart G. Wilson, York (GB); Dante J. Pacella, Charles Town, WV (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 82 days.

(21) Appl. No.: 17/107,197

(22) Filed: Nov. 30, 2020

(65) Prior Publication Data

US 2022/0173899 A1 Jun. 2, 2022

(51) Int. Cl.
*H04L 9/08* (2006.01)
*H04L 9/32* (2006.01)
*G06F 21/60* (2013.01)

(52) U.S. Cl.
CPC .......... *H04L 9/0869* (2013.01); *G06F 21/602* (2013.01); *H04L 9/085* (2013.01); *H04L 9/32* (2013.01)

(58) Field of Classification Search
CPC ......... H04L 9/0869; H04L 9/085; H04L 9/32; H04L 9/0662; H04L 9/0894; H04L 9/3226; G06F 21/602; G06F 21/64
See application file for complete search history.

(56) References Cited

U.S. PATENT DOCUMENTS

| | | | | |
|---|---|---|---|---|
| 5,901,227 | A * | 5/1999 | Perlman | H04L 9/0894 713/157 |
| 7,487,219 | B1 * | 2/2009 | Jia | G06F 21/6245 709/227 |
| 2009/0144543 | A1 * | 6/2009 | Fujii | H04L 9/085 713/160 |
| 2012/0066517 | A1 * | 3/2012 | Vysogorets | G06F 21/34 713/193 |
| 2021/0037076 | A1 * | 2/2021 | Long | H04L 65/1069 |
| 2022/0014354 | A1 * | 1/2022 | Valladolid | H04L 9/3231 |

OTHER PUBLICATIONS

A. Ranjan and M. Bhonsle, "Advanced technics to shared & protect cloud data using multilayer steganography and cryptography," 2016 International Conference on Automatic Control and Dynamic Optimization Techniques (ICACDOT), 2016, pp. 35-41 (Year: 2016).*

* cited by examiner

*Primary Examiner* — Philip J Chea
*Assistant Examiner* — Sangseok Park

(57) ABSTRACT

One or more computing devices, systems, and/or methods for data fragmentation and reconstruction are provided. Random number generation information, indicating a number of fragments into which data stored by a client device is to be fragmented, is received. The data is fragmented according to the number of fragments as a set of fragments. Authentication data is incorporated with the set of fragments. A set of entities capable of storing the set of fragments with the authentication data is identified. The set of fragments with the authentication data are stored across the set of entities.

20 Claims, 13 Drawing Sheets

DATA FRAGMENTATION AND RECONSTRUCTION

BACKGROUND

Various types of services, devices, and applications may implement data security and data privacy for user data, metadata, and/or other types of data. In an example, a private key may be utilized for data security, such as for encryption purposes. For example, the private key may be used by a client email application in order to send an email with an encrypted attachment. The private key may be stored within secure storage of a computing device hosting the client email application.

BRIEF DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION OF EXAMPLE EMBODIMENTS

Figure 1:
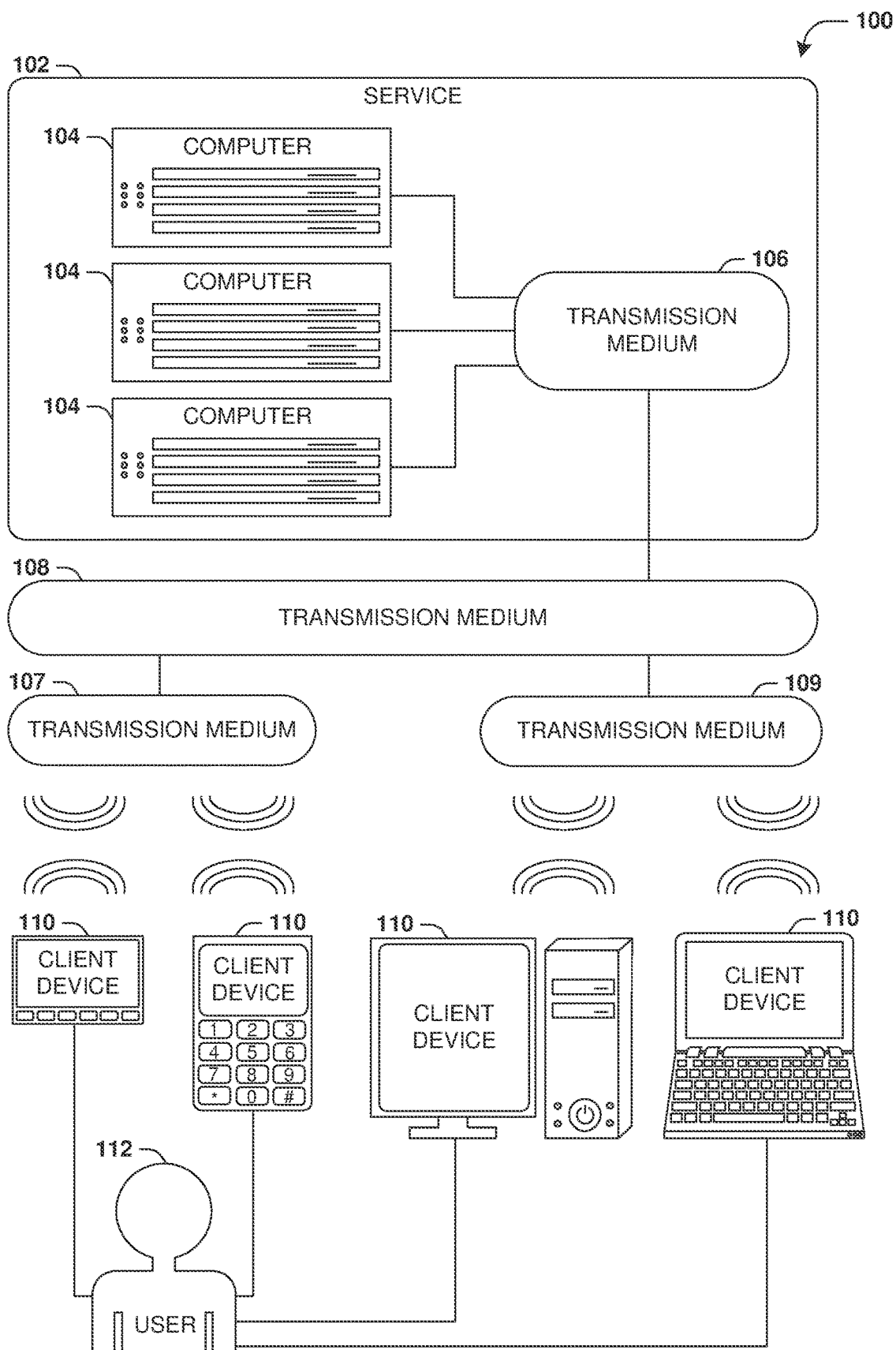
FIG. 1 is an illustration of a scenario involving various examples of transmission mediums that may be used to communicatively couple computers and clients.

Subject matter will now be described more fully hereinafter with reference to the accompanying drawings, which form a part hereof, and which show, by way of illustration, specific example embodiments. This description is not intended as an extensive or detailed discussion of known concepts. Details that are well known may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

A client device, such as a computer, a virtual machine, a phone, a smart device, a wearable device, a tablet, a laptop, hardware, software, or any other type of computing device, may maintain data, such as data that is meant to be kept secure and/or private. In an example, the data may relate to personal information, financial information, security information such as a private key used for encryption purposes, credentials and authentication data, and/or other data or metadata that a user of the client device may want to keep safe from other entities, such as malicious entities. This data may be stored within storage of the client device, such as secure storage of the client device (e.g., a SIM card, a chip within a credit/debit card, etc.). The data may be restricted from being migrated from the storage because the data could be compromised during and/or after migration, such as by a man in the middle attack or other techniques utilized by a malicious entity. Because the data is restricted from being migrated from the storage to another location, the ability to perform technical computer functions such as data migration, data backup operations, data restore operations, upgrading or replacing the client device, etc. may be limited. Furthermore, in certain situations, the data may become lost and/or inaccessible due to such restrictions, such as when the client device is replaced with a new client device (e.g., a user upgrades to a new phone or loses their current phone). This is because the data is restricted from being migrated from the client device to the new client device. If the data comprised a private key used to encrypt data, then the encrypted data may become lost and inaccessible from the new client device because the private key could not be migrated from the storage of the client device to the new client device.

Accordingly, as provided herein, data may be fragmented by the client device for storage across one or more entities in a secure manner. Information about the one or more entities at which the fragments are stored may be retained by a main service, such as within a main record. In this way, the client device may subsequently utilize the information from the main service in order to subsequently retrieve the fragments from the one or more entities and reconstruct the data from the fragments. In particular, the data, such as a private key or other data, may be anonymously fragmented in a manner that obscures the data (e.g., due to zero trust of entities/devices/accounts at which the fragments will be stored) for safely storing the fragments for subsequent retrieval and reconstruction of the data. In an embodiment, providing the ability to fragment and reconstruct the data allows for preservation of the data in secure manner (e.g., if the client device is upgraded to a new client device, then the data can be reconstructed at the new client device) and does not limit the performance of technical computer functions such as data migration operations, data backup operations, data restore operations, upgrading or replacing the client device, etc.

In an embodiment of fragmenting data, a client device may store data, such as a private key, within storage associated with the client device, such as within secure storage of the client device or other types of storage. Instead of being restricted to retaining the data within the storage, the client device may utilize the techniques described herein to fragment and distribute the data across multiple entities in a secure manner. Accordingly, the client device (e.g., a phone, a laptop, a computer, a wearable device, a smart device, any other type of computing device, a virtual machine, hardware, software, or combination thereof) may transmit a request to a main service (e.g., a computing device, a virtual machine, a service, a node, hardware, software, a multi-access edge computing device also known as a MEC device, or combination thereof). The request may specify that the client device wants to fragment the data for secure storage across one or more entities (e.g., a computing device, an account, a service, a virtual machine, hardware, software, or combination thereof). The request may comprise authentication data, such as biometric data of a user associated with the client device or other credentials such as a password.

The main service may authenticate the authentication data. In response to successfully authenticating the authentication data, the main service may obtain or generate random number generation information, such as quantum random number generation information. The main service may transmit the random number generation information to the client device. The client device may utilize the random number generation information to determine how many fragments into which the private key, for example, is to be fragmented. In this way, the client device may fragment the private key into a set of fragments corresponding to a number of fragments specified by the random number generation information.

In an embodiment, various chunking processes may be used to embed the fragments within blocks. In an example, a first chunking process may be utilized to store a fragment within a block comprising an entity identifier of an entity at which the block will be stored, a block identifier of the block, a random identifier associated with the random number generation information, a signature corresponding to the authentication data, and/or padding. In an example, a second chunking process may be utilized to store a fragment pointer, pointing to a location of a fragment, within a block comprising an entity identifier of an entity at which the block will be stored, a block identifier of the block, a random identifier associated with the random number generation information, a signature corresponding to the authentication data, and/or padding. It may be appreciated that a variety of different chunking processes and/or other techniques may be implemented for hiding and/or obscuring fragments, such as a Shamir's Secret Sharing (SSS) algorithm, hiding fragments within images, various steganography techniques (e.g., a Least Significant Bit technique, CMYK Separation, Discrete Wavelet Transformation, Peak Signal to Noise Ratio, etc.), various superimposition techniques, utilization of bodyguard accounts, and/or other technique that will be described in further detail below.

A set of entities (e.g., computing devices, services, accounts, etc.) capable of storing the set of fragments may be identified. In an embodiment, a single fragment is stored at a single entity. In an embodiment, multiple fragments may be stored at a single entity. In an embodiment, the set of entities may be specified by the main service, such as where the main service maintains a list of entities registered to store fragments. Accordingly, the client device may store the fragments across the set of entities in a secure manner because merely the client device has a reconstruction algorithm capable of reconstructing the private key from the fragments and/or has algorithms capable of locating the fragments and/or resolving hidden or obscured fragments.

In an embodiment, the user may utilize the authentication data (e.g., login credentials, a password, biometric data, etc.) to authenticate with the main service in order to be able to retrieve the fragments back to the client device or at a different client device (e.g., the user has replaced the client device with a new client device). For example, an entity list specifying the set of entities across which the set of fragments are stored may be received based upon the user successfully authenticating with the main service. The client device may utilize the entity list to locate and retrieve the fragments from the entities. A reconstruction algorithm may be executed to reconstruct the data, such as the private key, from the fragments, which may also involve executing other algorithms to resolve hidden or obscured fragments. In this way, the data may be reconstructed at the client device or at a different client device in a secure manner where the data is not exposed to malicious entities while stored as the fragments. Thus, the data is not restricted to being stored merely within the storage associated with the client device, and thus not limiting the ability to perform various technical computer functions such as data migration operations, data backup operations, data restore operations, upgrading or replacing the client device, etc.

The following provides a discussion of some types of computing scenarios in which the disclosed subject matter may be utilized and/or implemented.

FIG. 1 is an interaction diagram of a scenario 100 illustrating a service 102 provided by a set of computers 104 to a set of client devices 110 via various types of transmission mediums. The computers 104 and/or client devices 110 may be capable of transmitting, receiving, processing, and/or storing many types of signals, such as in memory as physical memory states.

The computers 104 of the service 102 may be communicatively coupled together, such as for exchange of communications using a transmission medium 106. The transmission medium 106 may be organized according to one or more network architectures, such as computer/client, peer-to-peer, and/or mesh architectures, and/or a variety of roles, such as administrative computers, authentication computers, security monitor computers, data stores for objects such as files and databases, business logic computers, time synchronization computers, and/or front-end computers providing a user-facing interface for the service 102.

Likewise, the transmission medium 106 may comprise one or more sub-networks, such as may employ different architectures, may be compliant or compatible with differing protocols and/or may interoperate within the transmission medium 106. Additionally, various types of transmission medium 106 may be interconnected (e.g., a router may provide a link between otherwise separate and independent transmission medium 106).

In scenario 100 of FIG. 1, the transmission medium 106 of the service 102 is connected to a transmission medium 108 that allows the service 102 to exchange data with other services 102 and/or client devices 110. The transmission medium 108 may encompass various combinations of devices with varying levels of distribution and exposure, such as a public wide-area network and/or a private network (e.g., a virtual private network (VPN) of a distributed enterprise).

In the scenario 100 of FIG. 1, the service 102 may be accessed via the transmission medium 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various communicative couplings to the transmission medium 108. As a first such example, one or more client devices 110 may comprise a cellular communicator and may communicate with the service 102 by connecting to the transmission medium 108 via a transmission medium 107 provided by a cellular provider. As a second such example, one or more client devices 110 may communicate with the service 102 by connecting to the transmission medium 108 via a transmission medium 109 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the computers 104 and the client devices 110 may communicate over various types of transmission mediums.

Figure 2:
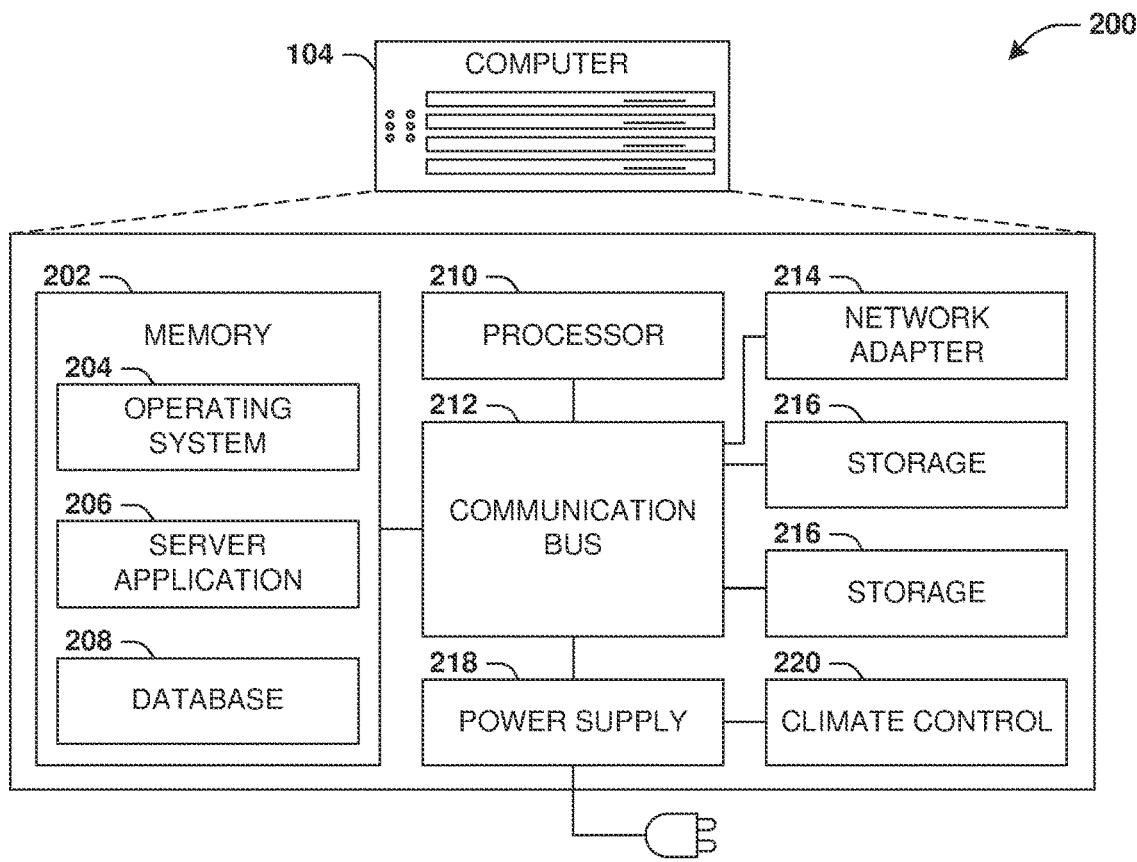
FIG. 2 is an illustration of a scenario involving an example configuration of a computer that may utilize and/or implement at least a portion of the techniques presented herein.

FIG. 2 presents a schematic architecture diagram 200 of a computer 104 that may utilize at least a portion of the techniques provided herein. Such a computer 104 may vary widely in configuration or capabilities, alone or in conjunction with other computers, in order to provide a service such as the service 102.

The computer 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The computer 104 may comprise memory 202 storing various forms of applications, such as an operating system 204; one or more computer applications 206; and/or various forms of data, such as a database 208 or a file system. The computer 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The computer 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the computer 104 with at least one other computer. Other components that may optionally be included with the computer 104 (though not shown in the schematic architecture diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the computer 104 to a state of readiness.

The computer 104 may operate in various physical enclosures, such as a desktop or tower, and/or may be integrated with a display as an "all-in-one" device. The computer 104 may be mounted horizontally and/or in a cabinet or rack, and/or may simply comprise an interconnected set of components. The computer 104 may comprise a dedicated and/or shared power supply 218 that supplies and/or regulates power for the other components. The computer 104 may provide power to and/or receive power from another computer and/or other devices. The computer 104 may comprise a shared and/or dedicated climate control unit 220 that regulates climate properties, such as temperature, humidity, and/or airflow. Many such computers 104 may be configured and/or adapted to utilize at least a portion of the techniques presented herein.

Figure 3:
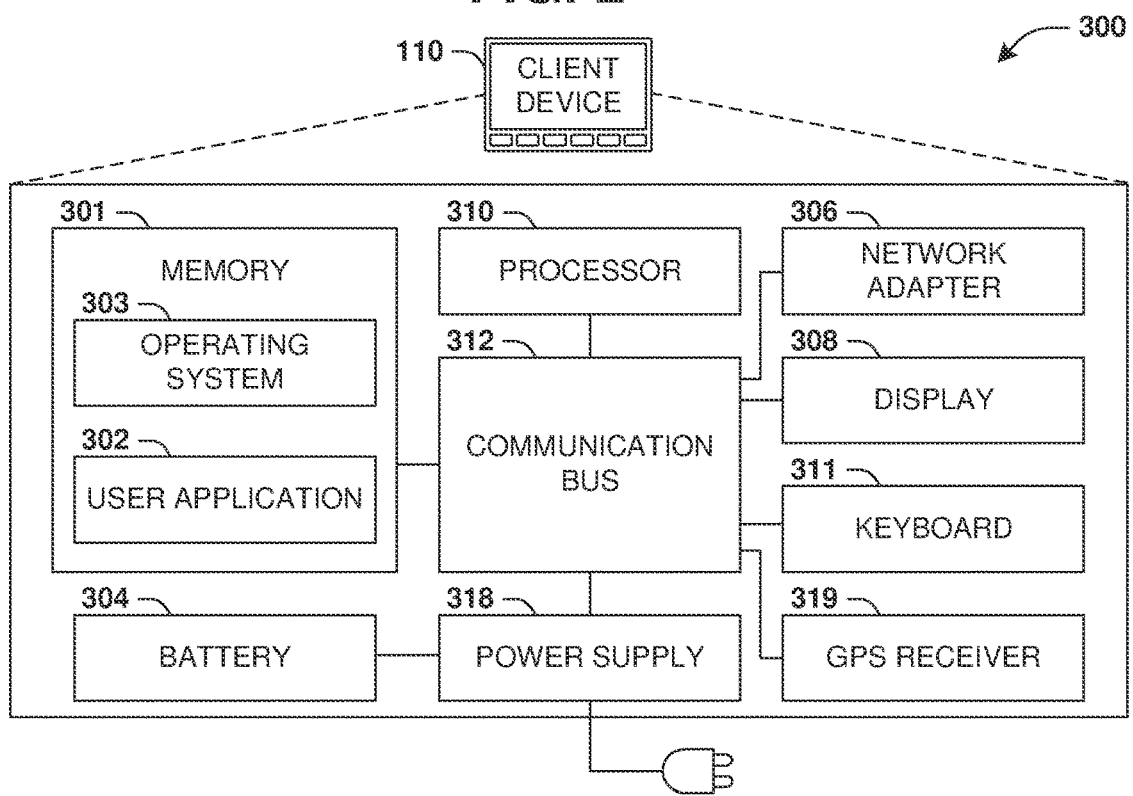
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

One or more systems and/or techniques for fragmenting and/or reconstructing data are provided. An embodiment of fragmenting data is illustrated by an exemplary method 400 of FIG. 4, and is further described in conjunction with system 500 of FIG. 5 and in conjunction with FIGS. 6 and 7. A client device 508 (e.g., a phone, a laptop, a computer, a wearable device, a smart device, any other type of computing device, a virtual machine, hardware, software, or combination thereof) may store data 510 such as within storage of the client device 508 (e.g., within a SIM card, a chip of a credit/debit card, secure storage, etc.), as illustrated by FIG. 5. The data 510 may correspond to any type of data, such as a private key used for encrypting data, user credentials, user data, metadata, etc. The client device 508 may determine that the data 510 is to be fragmented and stored across one or more entities, as opposed to being solely stored at the client device 508. For example, a user may invoke a command to trigger the fragmentation of the data 510 (e.g., a migrate command to migrate a private key within the data 510) or the determination may be automatically triggered such as during registration of a user account associated with the data 510 (e.g., during biometric enrollment by the user with the client device 508) or from any other trigger.

In an embodiment, the client device 508 may transmit a request to a main service 502 indicating that the client device 508 wants to fragment the data 510 for storage across one or more entities. The main service 502 may comprise a computing device, a service, a virtual machine, a multi-access edge computing (MEC) device, hardware, software, or combination thereof. The main service 502 may be configured as an orchestrator for facilitating the fragmentation and/or reconstruction of data by client devices. The request may comprise authentication data 512 associated with the user of the client device 508, such as login credentials, a password, biometric data, and/or any other authentication information.

In response to the main service 502 successfully authenticating the authentication data 512, the main service 502 may utilize a random number generator 504 (e.g., quantum random number generation (QRNG) issued by a quantum MEC device or other mechanism to generate random number generation information 514. The random number generation information 514 may be indicative of a number of fragments into which the client device 508 is to fragment the data 510. Accordingly, during operation 402 of method 400 of FIG. 4, the client device 508 may receive the random number generation information 514 from the main service 502. The client device 508 may evaluate the random number generation information 514 in order to determine the number of fragments into which the client device 508 is to fragment the data 510.

Figure 4:
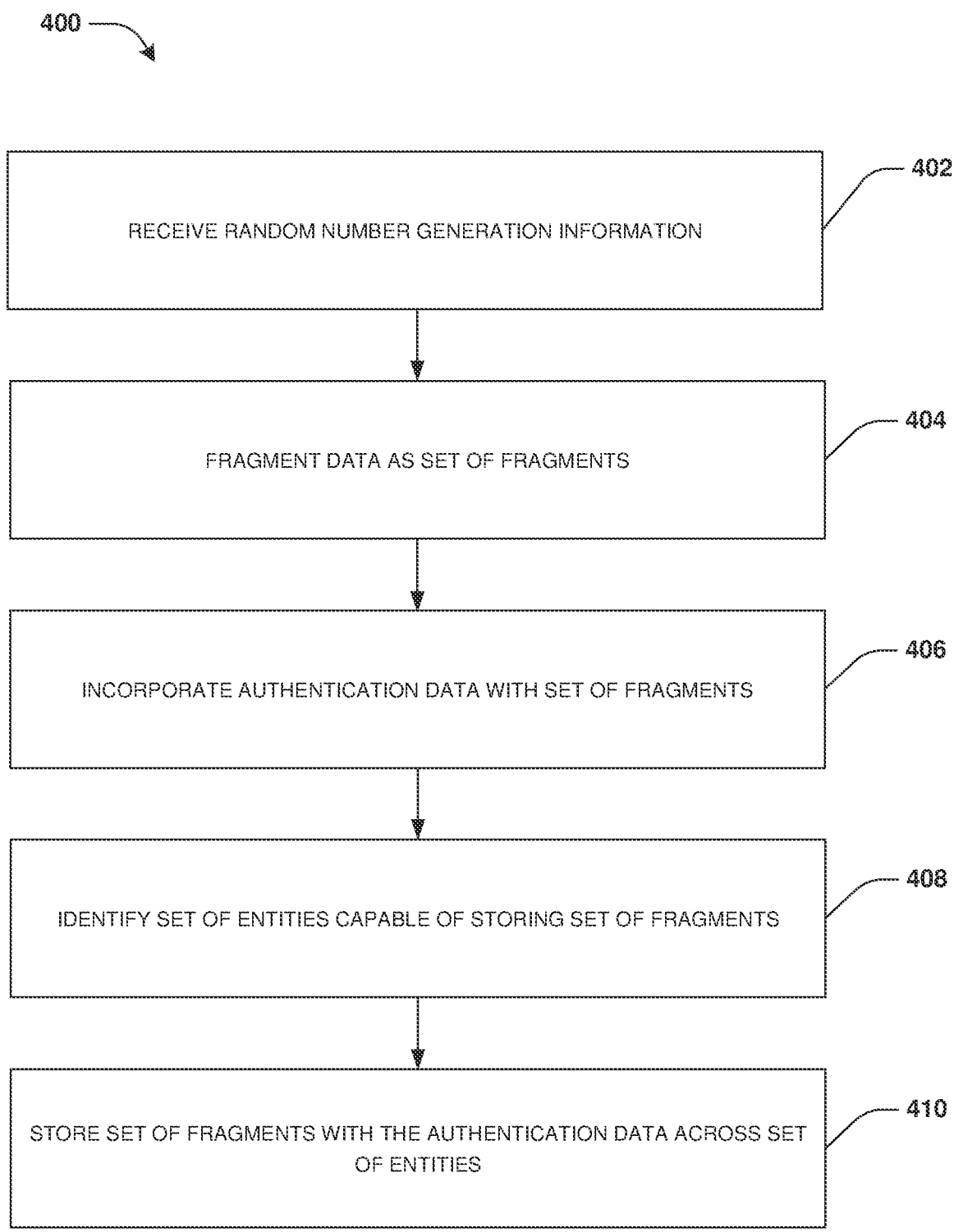
FIG. 4 is a flow chart illustrating an example method for fragmenting data.
Figure 5:
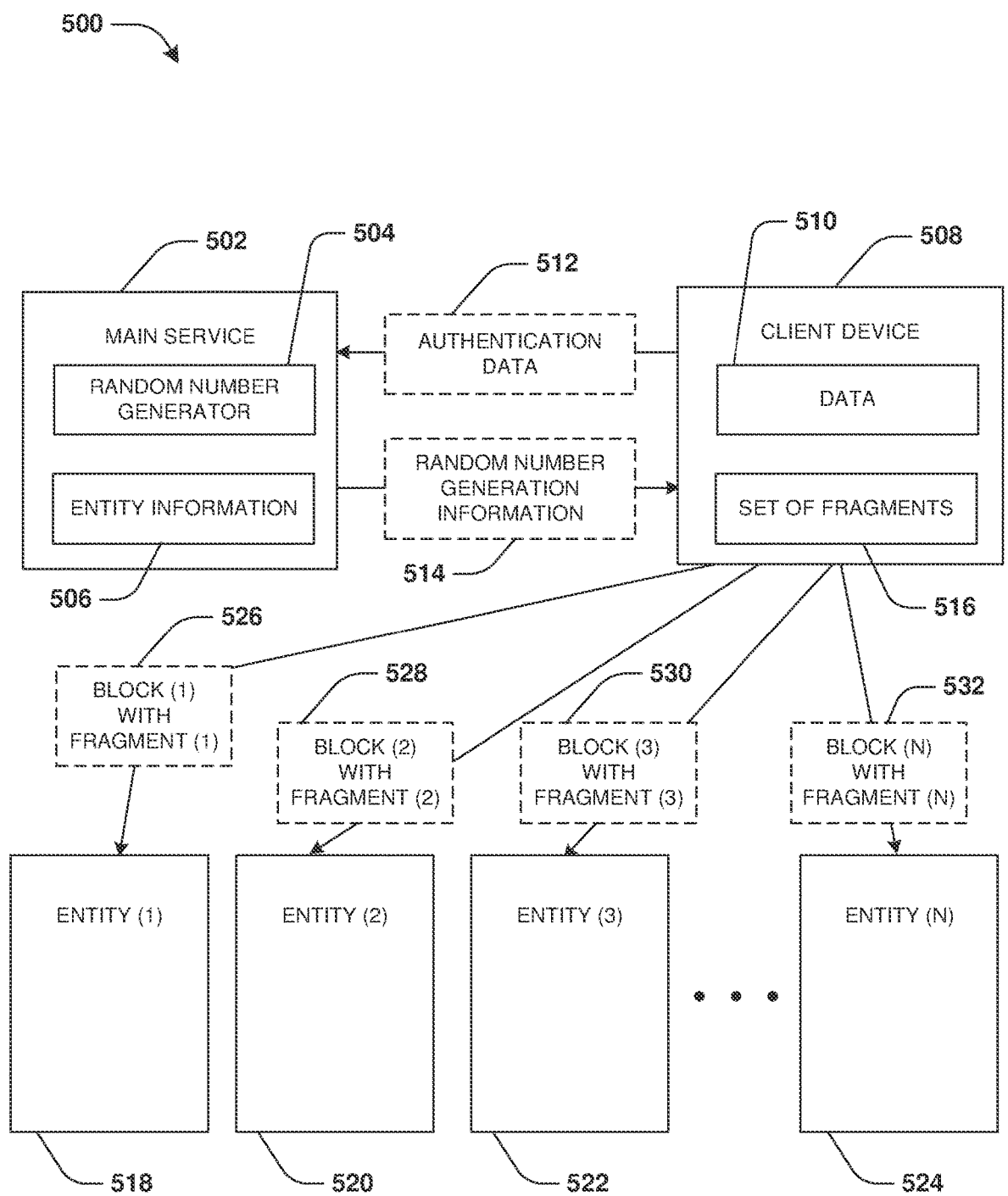
FIG. 5 is a component block diagram illustrating an example system for fragmenting data.

During operation 404 of method 400 of FIG. 4, the client device 508 fragments the data 510 into a set of fragments 516 according to the number of fragments indicated by the random number generation information 514. For example, the data 510 is fragmented into an integer number N of fragments (e.g., 5 fragments, 10 fragments, 12 fragments, 52 fragments, or any other number of fragments). Various chunking processes, algorithms, and/or other techniques may be utilized to fragment the data 510, such as a Shamir's Secret Sharing (SSS) algorithm.

In order to store the set of fragments 516 in a secure manner across one or more entities and/or securely reconstruct the data 510 from the set of fragments 516, the authentication data 512 may be associated with the set of fragments 516. Accordingly, during operation 406 of method 400 of FIG. 4, the authentication data 512 is incorporated with the set of fragments 516. In an embodiment of incorporating the authentication data 512 with the set of fragments 516, one or more chunking processes may be utilized to incorporate the authentication data 512 with the set of fragments 516.

Figure 6:
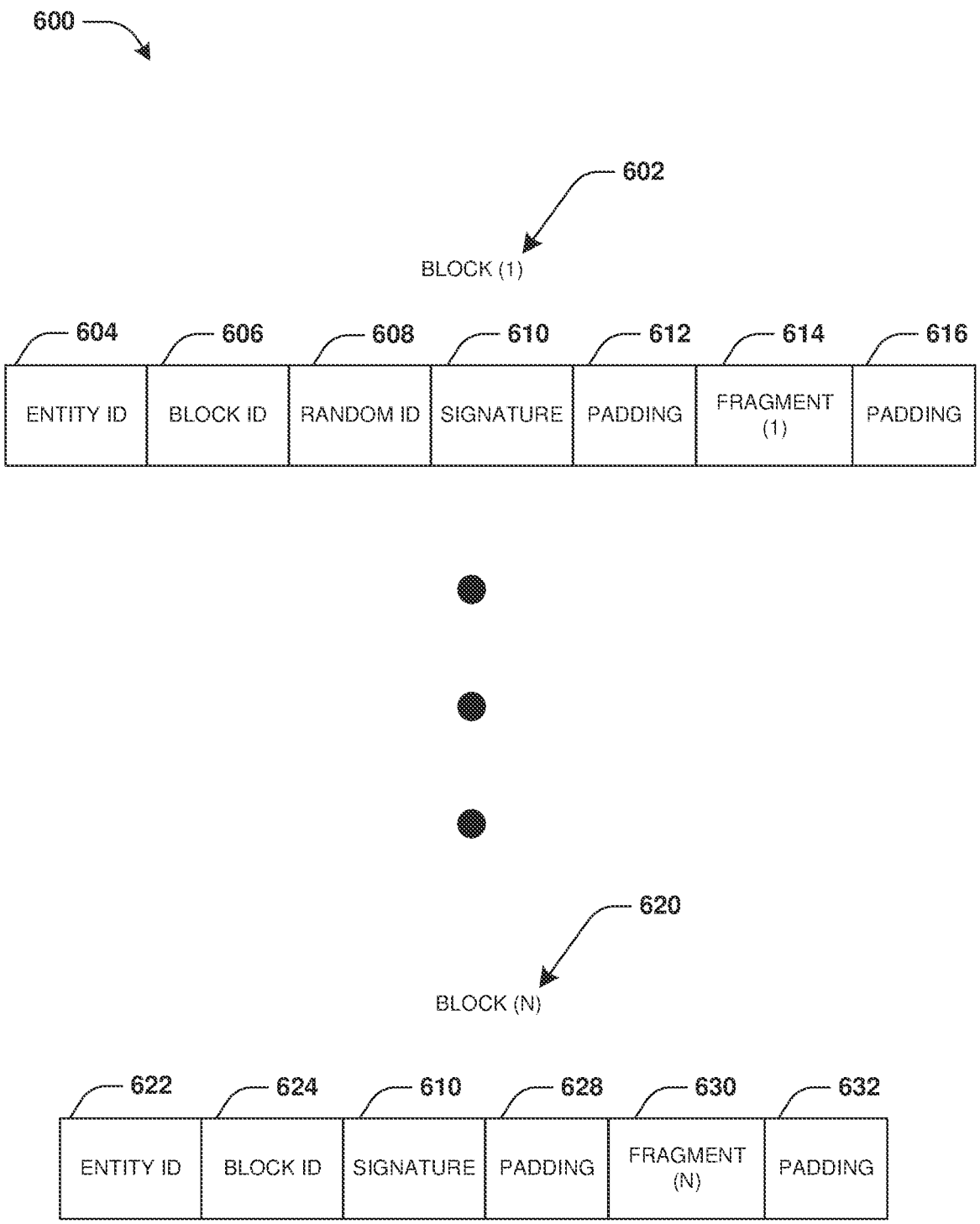
FIG. 6 is an illustration of one or more blocks comprising fragments of data.

In an embodiment, a first chunking process may be utilized to chunk a first fragment 614 of the set of fragments 516 into a first block 602, as illustrated by example 600 of FIG. 6. The first chunking process may store at least one of an entity identifier 604 of an entity at which the first block 602 (the first fragment 614) is to be stored, a block identifier 606 of the first block 602, a random identifier 608 corresponding to a randomized algorithm identifier (e.g., an identifier associated with the random number generator 504), a signature 610 corresponding to the authentication data 512 (e.g., a signature or hash associated with credentials, biometric data, or other authentication information of the user), padding 612 before the first fragment 614, the first fragment 614, and/or padding 616 after the first fragment 614 into the first block 602. The first chunking process may create blocks into which each fragment of the set of fragments 516 are stored, such as a block (N) 620 comprising an entity identifier 622 of an entity at which the block (N) 620 (the fragment (N) 630) is to be stored, a block identifier 624 of the block (N) 620, a signature 610 corresponding to the authentication data 512 (e.g., a signature or hash associated with credentials, biometric data, or other authentication information of the user), padding 628 before the fragment (N) 630, the fragment (N) 630, and/or padding 632 after the fragment (N) 630 into the block (N) 620. In exemplary aspects, the blocks may be of the same size, or may differ in size, depending on user specification.

Figure 7:
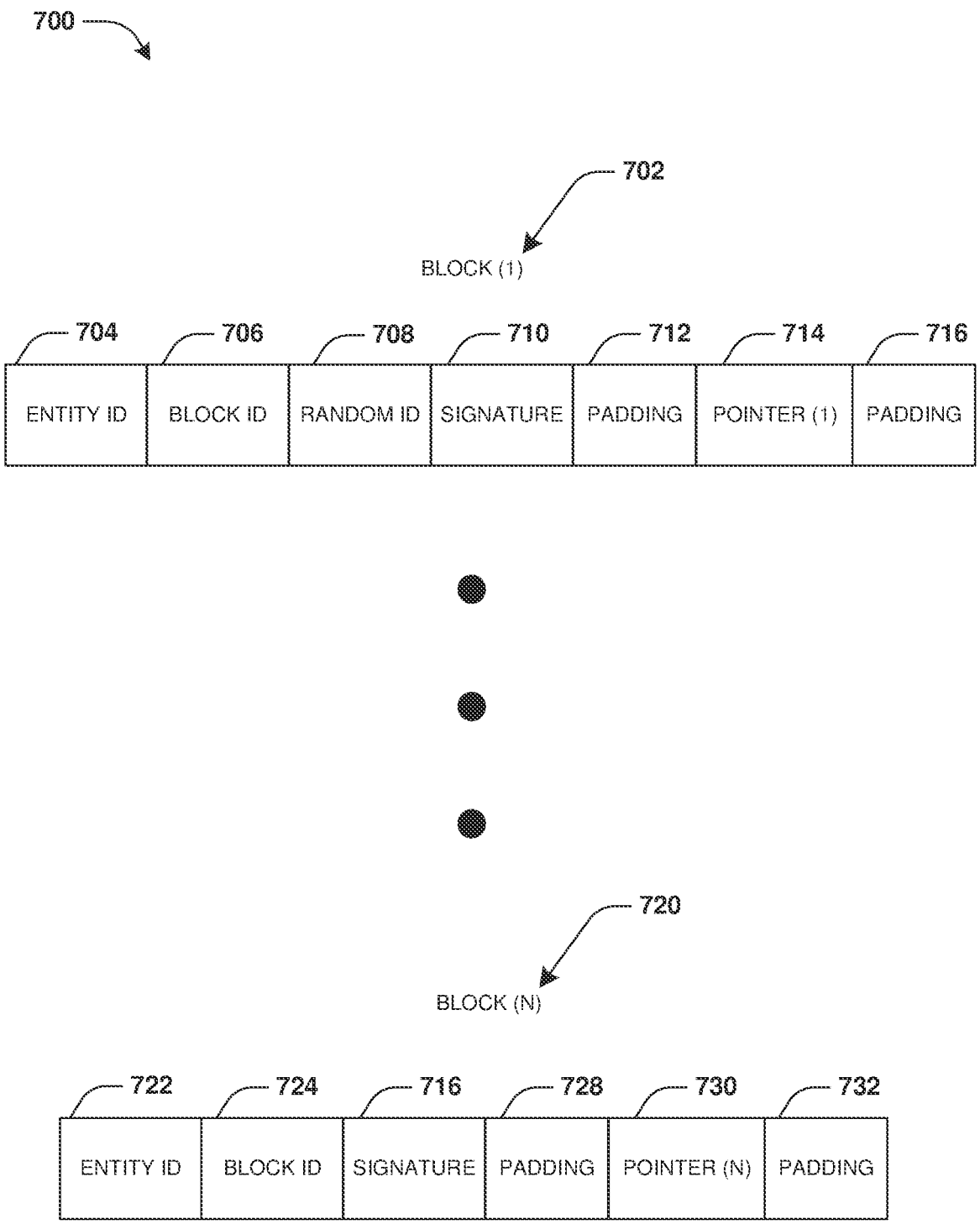
FIG. 7 is an illustration of one or more blocks comprising pointers to fragments of data.

In an embodiment, a second chunking process may be utilized to create blocks associated with the set of fragments 516, as illustrated by example 700 of FIG. 7. The second chunking process may differ from the first chunking process in that a fragment pointer to a location of a fragment is stored within a block by the second chunking process, as opposed to the actually fragment being stored within the block by the first chunking process. The second chunking process may create a first block 702 associated with a first fragment. The first block 702 may comprise at least one of an entity identifier 704 of an entity at which the first block 702 is stored, a block identifier 706 of the first block 702, a random identifier 708 corresponding to a randomized algorithm identifier (e.g., an identifier associated with the random number generator 504), a signature 710 corresponding to the authentication data 512 (e.g., a signature or hash associated with credentials, biometric data, or other authentication information of the user), padding 712 before a first fragment pointer 714, the first fragment pointer 714 pointing to a location of the first fragment, and/or padding 716 after the first fragment pointer 714. In an embodiment, the first fragment pointer 714 may point to a different storage location within the entity at which the first block 702 is stored or may point to a storage location within a different entity. In an embodiment, the first fragment pointer 714 may correspond to and/or point to a location corresponding to a history of browser websites, a cookie, a token, cached data collected by a MEC device, etc. The second chunking process may create blocks associated with each fragment of the set of fragments 516, such as a block (N) 720 comprising an entity identifier 722 of an entity at which the block (N)

720 is to be stored, a block identifier 724 of the block (N) 720, a signature 710 corresponding to the authentication data 512 (e.g., a signature or hash associated with credentials, biometric data, or other authentication information of the user), padding 728 before a fragment pointer (N) 730, the fragment pointer (N) 730 pointing to a location of a fragment (N), and/or padding 732 after the fragment pointer (N) 730.

In this way, a set of N blocks comprising the fragments or fragment pointers to locations of the fragments may be generated, in an embodiment. For example, a first block 526 associated with a first fragment of the set of fragments 516, a second block 528 associated with a second fragment of the set of fragments 516, a third block 530 associated with a third fragment of the set of fragments 516, and/or other blocks associated with other fragments such as a block (N) 532 associated with a fragment (N) may be created, as illustrated by FIG. 5. In an embodiment, a block may correspond to a data structure or storage element within which a fragment or other data and metadata may be stored and the blocks may differ in size.

During operation 408 of method 400 of FIG. 4, a set of entities capable of storing the set of fragments 516 (e.g., storing the set of blocks associated with the set of fragments 516) may be identified. In an embodiment of identifying the set of entities, the main service 502 may maintain entity information 506 corresponding to entities (e.g., services, accounts, computing device, etc.) that can store fragments on behalf of client devices. The main service 502 may utilize the entity information 506 in order to provide the client device 508 with an indication of the set of entities capable of storing the set of fragments, such as for storing the first block 526 associated with the first fragment, the second block 528 associated with the second fragment, a third block 530 associated with the third fragment, the block (N) 532 associated with the fragment (N), etc.

During operation 410 of method 400 of FIG. 4, the set of fragments 516, such as the set of blocks associated with the set of fragments, may be stored across the set of entities. In an embodiment, merely a single block or fragment may be stored at an entity. In an embodiment, multiple blocks or fragments may be stored at an entity. In an embodiment, the first block 526 associated with the first fragment may be stored at a first entity 518, the second block 528 associated with the second fragment may be stored at a second entity 520, the third block 530 associated with the third fragment may be stored at a third entity 522, the block (N) 532 associated with the fragment (N) may be stored at an entity (N) 524. In an embodiment of storing the set of fragments 516 (set of blocks) across the set of entities, a distributed storage distribution mechanism, such as a torrent type mechanism may be utilized to distribute the set of fragments (set of blocks) across the set of entities. In this way, the data 510 may be fragmented and stored across one or more entities in a secure manner so that the user can subsequently retrieve the fragments and reconstruct the data 510 at the client device 508 or at other client devices without the data 510 being exposed to being compromised by a malicious actor/entity.

In an embodiment, various techniques and/or algorithms may be implemented to hide and/or obscure the set of fragments 516. In an embodiment of hiding and/or obscuring the set of fragments 516, the data 510 may comprise a private key. The private key or fragments of the private key may be embedded within multiple placeholder keys leveraging a random number generation large factor number (e.g., a quantum random number generation (QRNG) large factor number). In an embodiment, a placeholder key may comprise a fragment of a private key, as opposed to the entire private key. In some instances, the placeholder key may appear to be an entire private key (e.g., the placeholder key is a fake key that does not comprise an entire private key necessary to decrypt data), but merely comprises one or many fragments of the private key. In this way, the private key or fragments of the private key may be embedded into a plurality of placeholder keys stored across the set of entities.

In an embodiment of hiding and/or obscuring the set of fragments 516, the data 510 may be fragmented across one or more images, such as across one or more photos. In an example, the data 510 may be fragmented across one or more images for a single paired account without encryption. In this way, there is no encoding key to store at the client device or other storage location such as within a distributed computing environment (e.g., the cloud). This allows for relatively simple reconstruction of the data 510. In an embodiment of hiding and/or obscuring the set of fragments 516, the data 510 may be fragmented and encoded across one or more accounts (e.g., each entity of the set of entities may correspond to an account). In an example, the data 510 may be fragmented and encoded at a given offset and/or other steganography techniques may be utilized to further hide the fragments utilizing an encoded key. In an example, biometric data may be utilized to encode the set of fragments 516 so that another encoding key does not need to be maintained. In an example, the biometric data may correspond to the authentication data 512. In an embodiment, the random number generation information 514 (e.g., quantum randomness) may be utilized for identifying which accounts and/or how many accounts to utilize for storing the fragments, which images and/or how many images to utilize for storing the fragments, which offsets to utilize for storing the fragments, and/or what techniques to utilize for fragmenting and reconstructing the data 510.

Figure 11:
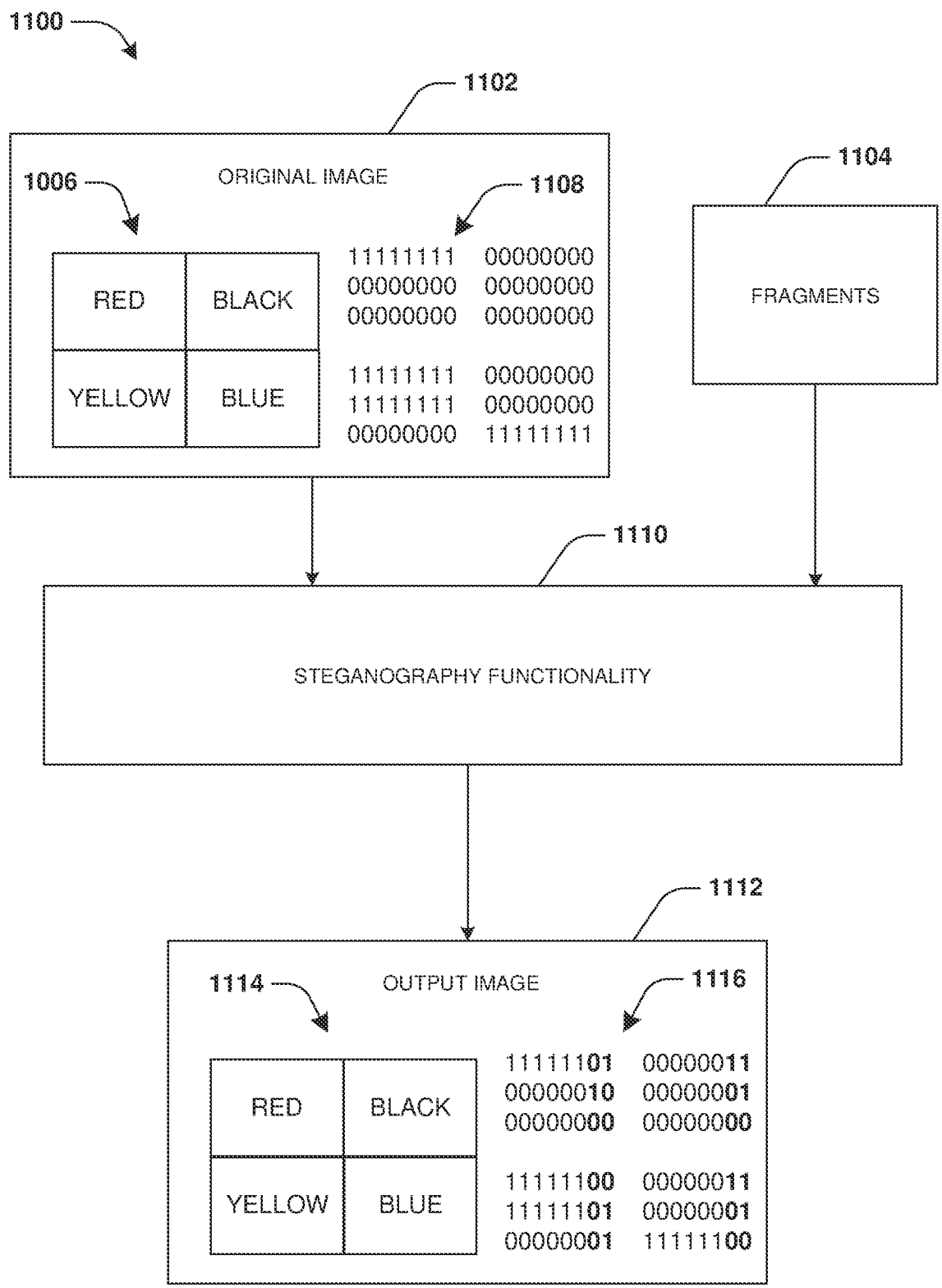
FIG. 11 is a component block diagram illustrating an example system for implementing steganography functionality for hiding and/or obscuring fragments of data.

In an embodiment of hiding and/or obscuring the set of fragments 516, one or more steganography techniques may be utilized, as illustrated by system 1110 of FIG. 11. In an embodiment of utilizing a steganography technique for hiding and/or obscuring the set of fragments 516, a Least Significant Bit (LSB) technique may be implemented. The Least Significant Bit technique may utilize changes in the least significant bit or N number of bits (e.g., starting from the left) to mask or store data for a hidden message. In an example, the Least Significant Bit technique may store a fragment within the data of the hidden message. In an embodiment of utilizing a steganography technique for hiding and/or obscuring the set of fragments 516, a CMYK Separation technique (e.g., separation of cyan, magenta, yellow, and black of a digital image) may be utilized to hide data within images. In an example, the CMYK Separation technique may store a sequence of data within a specific color plate or layer (e.g., within a cyan, magenta, yellow, or black plate or layer), such as within less than all color plates or layers (e.g., a single color plate or layer). The CMYK Separation technique may store a fragment within a single color plate or layer, such as merely within a black layer or other color layer.

In an embodiment of utilizing a steganography technique for hiding and/or obscuring the set of fragments 516, a Discrete Wavelet Transform (DWT) technique may be implemented. In an example, the Discrete Wavelet Transform technique may embed a fragment into an image using an 8×8 (or any other size) blocking of the image. The Discrete Wavelet Transform technique may utilize a three-stage decomposition (transformation) of the image using low pass and/or high pass filters for each block. Data of the fragment may be embedded into an $LH_3$ portion of a block. In this way, one or more transforms may be performed to embed the fragment into the image (e.g., the three-stage decomposition may perform transformations resulting in an LL, LH, HL, and HH sub-portions/bands, and a transform is repeated on each LL until the $LH_3$ portion results). This Discrete Wavelet Transform technique may have low detection (e.g., low detection that a fragment is embedded into the image), resistance to data destruction through compression (e.g., compression of the image may not destroy the embedded fragment), and has moderate payload capacity.

In an embodiment of utilizing a steganography technique for hiding and/or obscuring the set of fragments 516, a Peak Signal to Noise Ratio PSNR) technique may be implemented to embed a fragment into an image. In an embodiment of utilizing a steganography technique for hiding and/or obscuring the set of fragments 516, various inverse analysis and noise analysis techniques may be implemented to embed a fragment into an image, such as a pixel defects technique, a fixed pattern noise (FPN) technique, a Photo Response Non Uniformity (PRNU) technique, and/or utilizing compression differences in regions of an image such as though an inverse image forensic technique. In this way, various steganography techniques may be utilized for hiding and/or obscuring the set of fragments 516.

In an embodiment, steganography functionality 1110 may be utilized to implement various types of steganography techniques utilized for hiding and/or obscuring fragments 1104 (e.g., the set of fragments 516), as illustrated by FIG. 11. In an example, the steganography functionality 1110 may hide the fragments 1104 within an original image 1102 to create an output image 1112. For example, one or more of the fragments 1104 may be embedded within bits 1108 associated with the original image 1102 (e.g., bits 1108 associated with color data 1006 of the original image 1102) to create the output image 1112 comprising color data 1114 and bits 1116 within which the one or more fragments of the fragments 1104 are hidden.

Figure 12:
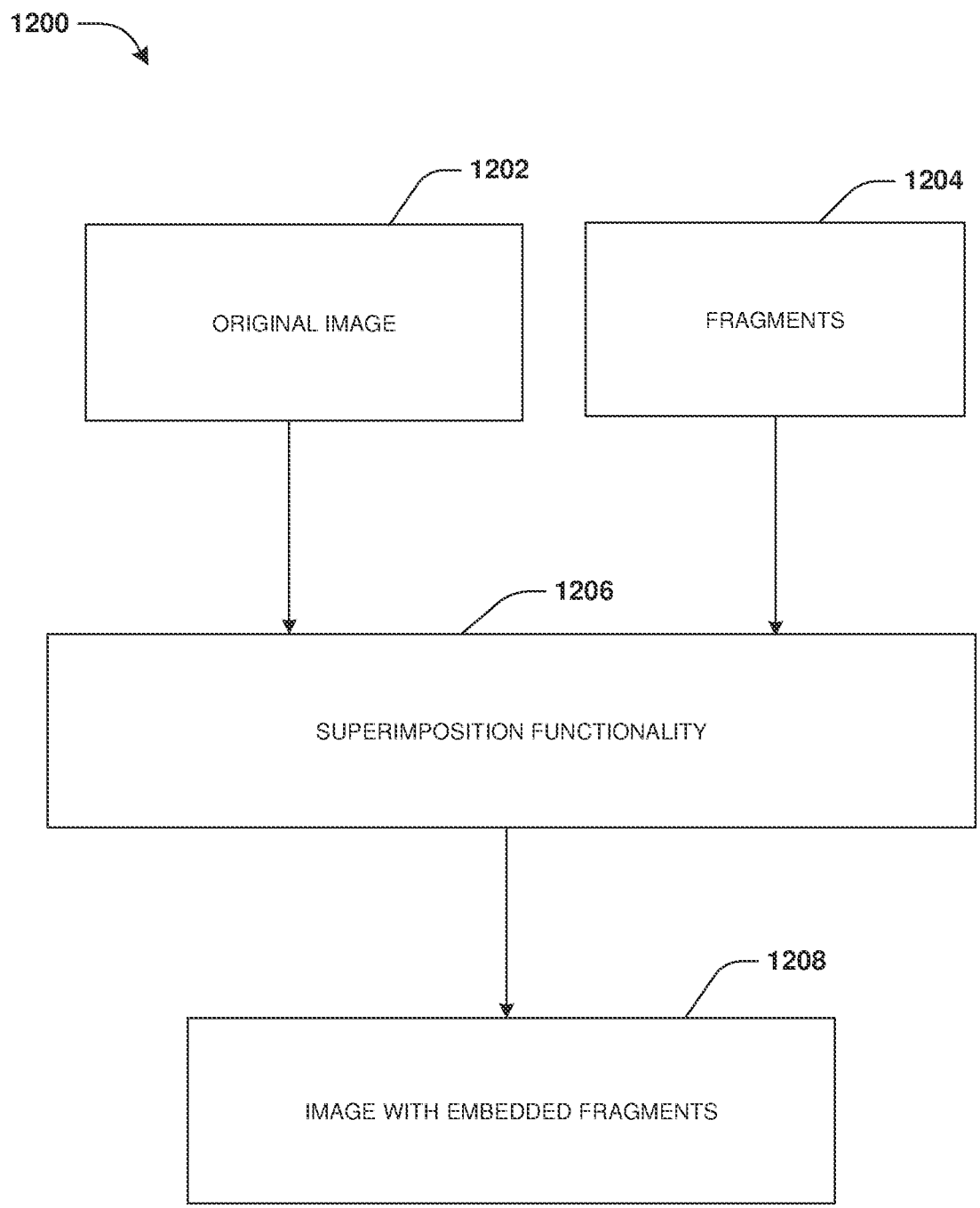
FIG. 12 is a component block diagram illustrating an example system for implementing superimposition functionality for hiding and/or obscuring fragments of data.

In an embodiment of hiding and/or obscuring the set of fragments 516, one or more superimposition techniques may be utilized, as illustrated by FIG. 12. Superimposition functionality 1206 may utilize a superimposition technique to hide and/or obscure fragments 1204 (e.g., the set of fragments 516) within an original image 1202 to create an image 1208 with the fragments 1204 embedded therein. In an embodiment of utilizing a superimposition technique for hiding and/or obscuring the set of fragments 516, the superimposition technique may utilize a self-similar photo, a video, an XR object, one or more pre-existing accounts, backup data to multiple banned accounts, and/or content removal for uncontrolled accounts in order to hide and/or obscure the set of fragments. The superimposition technique can utilize existing accounts and data of the existing accounts (e.g., without consent, such as where an account is banned) so that content of these existing accounts can be utilized as a free map of random data storage for hiding and/or obscuring a fragment, which may be performed without having to modify images associated with the existing accounts, for example.

In an embodiment of utilizing a superimposition technique for hiding and/or obscuring the set of fragments 516, a photo may be broken down into layers, such as RBG layers (e.g., a red layer, a black layer, and a green layer), CMYK layers (e.g., a cyan layer, a magenta layer, a yellow layer, and a black layer), Lab layers (e.g., a luminosity layer corresponding to brightness and two independent chromaticity layers A and B), HSL layers (e.g., a hue layer, a saturation layer, and a luminance layer), HSB layers (e.g., a hue layer, a saturation layer, and a brightness layer), etc. The layers may be rotated according to a given rotation, and results may be analyzed to derive fragment data. In an example, the fragment data may be embedded within or derived from pixels that fall out of the original photo pattern for a given layer (e.g., a green layer). In an example, the fragment data may be embedded within or derived from pixels from each layer that fall outside of the original photo pattern in an overlapping space. In an example, the fragment data may be embedded within or derived from coordinates of each pixel that align across all layers (e.g., a Procrustes Analysis or a GPA optimized mean shape from three or more source shapes). In an example, the fragment data may be embedded within or derived from pixel values or coordinates that align with a mathematical function or set of functions. In this way, a fragment may be embedded within or derived from layers of a single or multiple images (e.g., from particular pixels, coordinates, and/or pixels values within the images).

Figure 13:
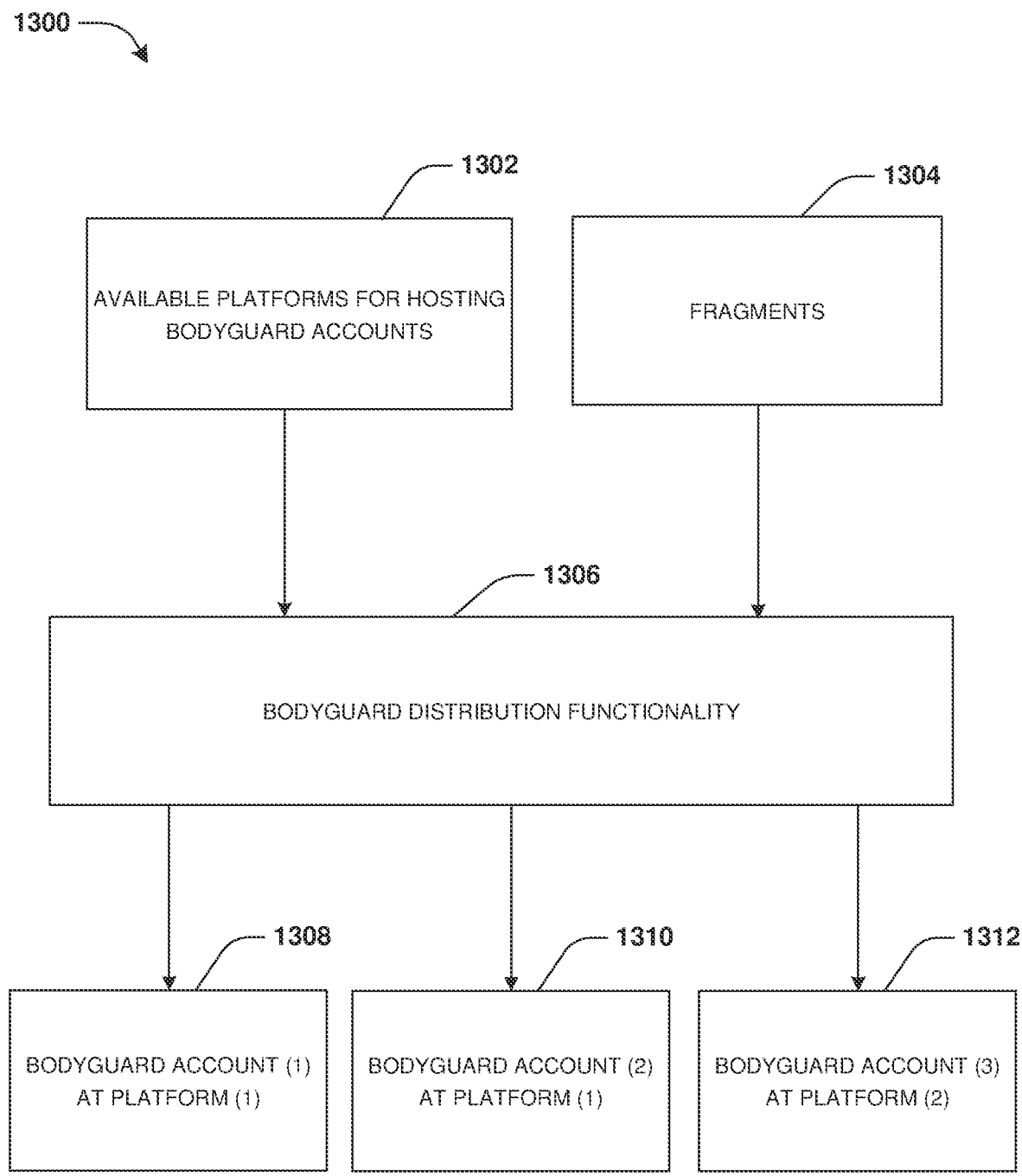
FIG. 13 is a component block diagram illustrating an example system for implementing bodyguard distribution functionality for hiding and/or obscuring fragments of data.

In an embodiment of hiding and/or obscuring the set of fragments 516, one or more bodyguard accounts may be utilized, as illustrated by FIG. 13. A bodyguard account may be a fake account that is not being utilized for nefarious/malicious purposes (e.g., sybil attacks, sock puppets, and bot armies may be fake accounts in social media, decentralized networks, blogspace, etc. that are used for nefarious/malicious purposes) and not being used as a state sponsored account that is elaborate and hosted within large data centers. That is, the bodyguard account is a fake account that is utilized for non-nefarious and non-malicious purposes, such as for hiding and/or obscuring a fragment of the set of fragments.

In an example, the bodyguard account may be a fake account within a social network, a decentralized network, a blogspace, a service, and/or any other type of platform. In this way, bodyguard accounts may be spread across a multitude of platforms. In an example, the bodyguard accounts may be administered and coordinated in a manner that prevents detection as well as malicious actions by third-party actors. A social web may be self-supported within a bodyguard ecosystem and/or can interact with outside "real" accounts. A bodyguard controller may utilize a profile randomizer (e.g., to create random profiles for the bodyguard accounts), activity randomizer (e.g., to have the bodyguard accounts perform randomized activities), and/or a social web manager to manage the bodyguard accounts. Content uploaded to a bodyguard account may be randomly embedded with one or more fragments of the set of fragments 516, which may not include all posted content in order to further minimize detection as well as further securing the set of fragments 516.

In an embodiment, bodyguard distribution functionality 1306 may be implemented to create bodyguard accounts across available platforms 1302 for hosting bodyguard accounts, such as a first bodyguard account 1308 at a first platform, a second bodyguard account 1310 at the first platform, a third bodyguard account 1312 at a second platform, as illustrated by FIG. 13. In this way, the bodyguard distribution functionality 1306 may hide fragments 1304 (e.g., the set of fragments 516) across the bodyguard accounts.

In this way, data and/or private keys may be discretely fragmented (disintegrated) into hidden quantum resilient fragments, which can be reconstructed without compromising the data and/or private keys.

Figure 8:
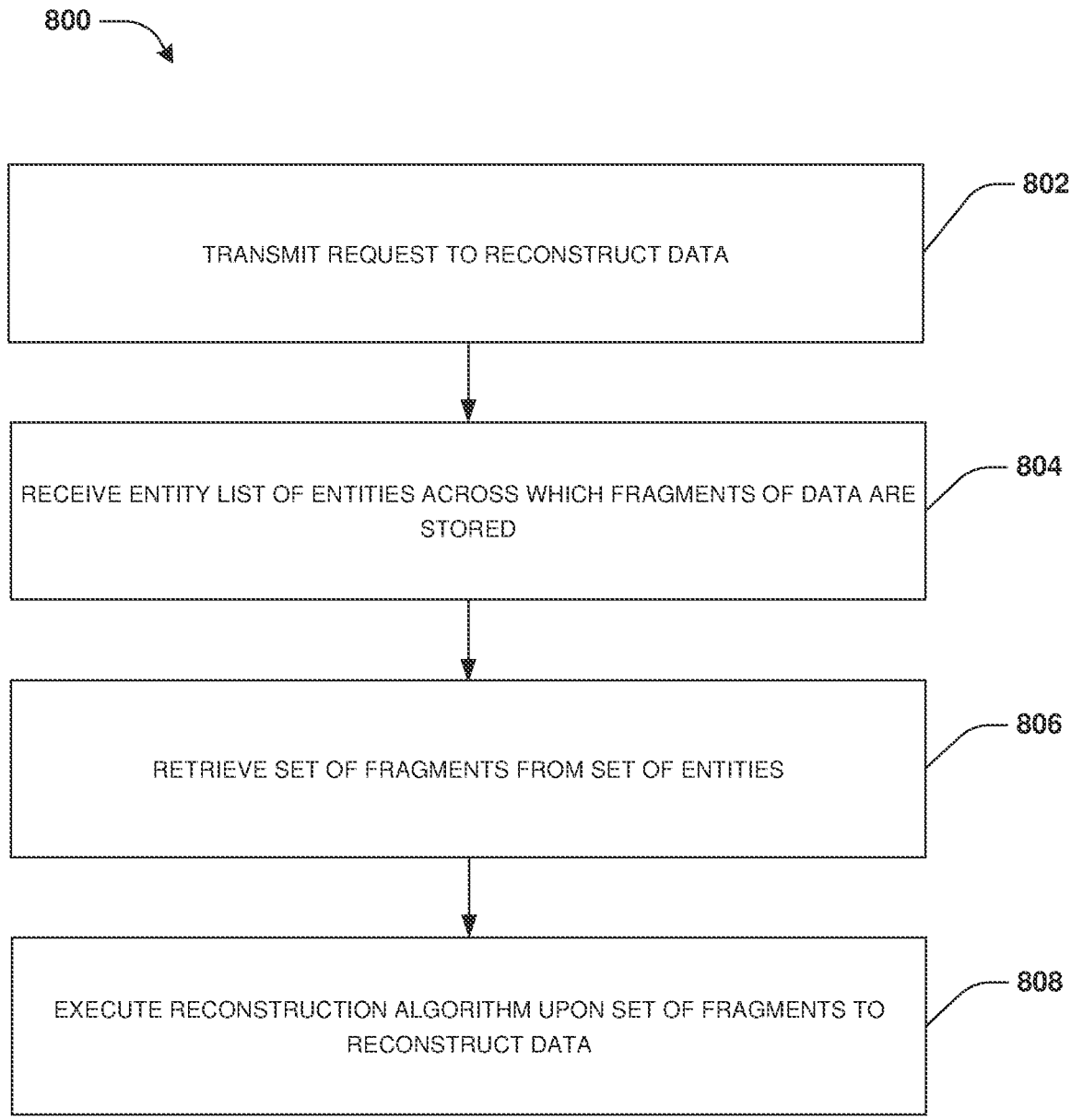
FIG. 8 is a flow chart illustrating an example method for reconstructing data.
Figure 9:
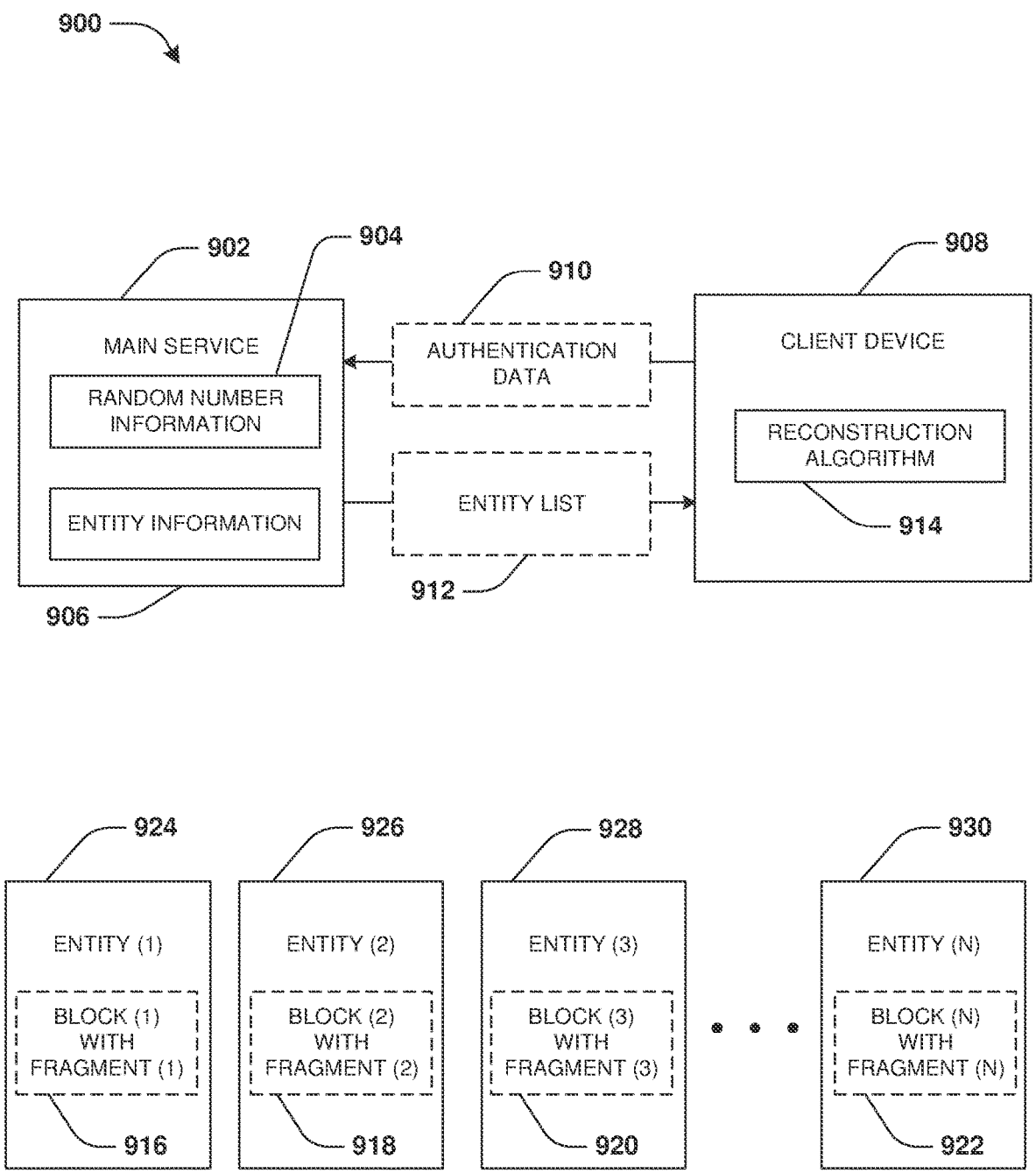
FIG. 9 is a component block diagram illustrating an example system for reconstructing data.

An embodiment of reconstructing data is illustrated by an exemplary method 800 of FIG. 8, and is further described in conjunction with system 900 of FIG. 9. A user associated with a client device 908 (e.g., a phone, a laptop, a computer, a wearable device, a smart device, any other type of computing device, a virtual machine hardware, software, or combination thereof) may have previously fragmented data, such as a private key, and stored the fragments across one or more entities. In an embodiment, the data may have been initially stored and fragmented at the client device 908 or at a different client device (e.g., the user may have fragmented the data initially stored on a phone, and then subsequently upgraded to a new phone that is the client device 908).

In an embodiment, the data may have been fragmented into an integer number N fragments, such as a first fragment, a second fragment, a third fragment, and/or other fragments such as a fragment (N). In an embodiment, the fragments may have been stored within blocks, such as where the first fragment is stored within a first block 916, the second fragment is stored within a second block 918, the third fragment is stored within a third block 920, the fragment (N) is stored within a block (N) 922, etc. In an embodiment, instead of storing the fragments within the blocks, fragment pointers are stored within the blocks. The fragment pointers may point to locations at which the fragments are stored. Other information may have been stored within the blocks such as at least one of an entity identifier of an entity at which a block is stored, a block identifier of the block, a signature corresponding to authentication data of the user (e.g., a signature or hash associated with credentials, biometric data, or other authentication information of the user), and/or padding.

In an embodiment, the blocks may have been stored across one or more entities. For example, the first block 916 may have been stored at a first entity 924, the second block 918 may have been stored at a second entity 926, the third block 920 may have been stored at a third entity 928, the block (N) 922 may have been stored at an entity (N) 930, etc. In an embodiment, the first block 916 may be stored at the main service 902, such that the first entity 924 is the main service 902. In an embodiment, the first block 916 is not stored at the main service 902, such that the first entity 924 is not the main service 902.

In an embodiment, a determination is made that the data, such as the private key, is to be reconstructed at the client device 908 (e.g., in response to a request from the user, automatically triggered during a setup procedure on the client device 908, or in response to any other triggers). Accordingly, during operation 802 of method 800 of FIG. 8, the client device 908 may transmit a request to a main service 902 indicating that the client device 908 wants to reconstruct the data at the client device 908. In an embodiment, the request may comprise authentication data 910 associated with the user, such as biometric data or other data. In response to successfully authenticating the authentication data 910 (e.g., the signature within the first block 916 may be validated based upon the authentication data 910), random number information 904, indicative of a number of fragments into which the data was fragmented, may be determined by the main service 902, such as using a random identifier within a block. The main service 902 may utilize the random number information 904, block identifier(s), entity identifier(s), entity information 906 indicative of entities at which the fragments were stored to create an entity list 912 specifying the entities where the fragments may be retrieved from by the client device 908, such as the first entity 924, the second entity 926, the third entity 928, the entity (N) 930, and/or other entities.

During operation 804 of method 800 of FIG. 8, the client device 908 may receive the entity list 912 from the main service 902 in response to the main service 902 successfully authenticating the authentication data 910. The client device 908 may execute a reconstruction algorithm 914 and/or other algorithms to resolving hidden and/or obscured fragments in order to identify, retrieve, and/or extract the fragments from the blocks stored across the entities. Because the ability to reconstruct the data from the fragments may be kept secret within the reconstruction algorithm 914, other entities such as malicious entities on other devices are unable to reconstruct the data, and thus the fragments were stored across the entities in a secure manner.

During operation 806 of method 800 of FIG. 8, the set of fragments are retrieved from the entities. In an example, the client device 908 utilizes the entity list 912 to locate and retrieve the first block 916 from the first entity 924, the second block 918 from the second entity 926, the third block 920 from the third entity 928, the block (N) 922 from the entity (N) 930, etc. During operation 808 of method 800 of FIG. 8, the client device 908 may execute the reconstruction algorithm 914 and/or other algorithms capable of resolving hidden and/or obscured fragments (e.g., fragments hidden using placeholder keys, images, accounts, steganography techniques, superimposition techniques, bodyguard accounts, etc.) to extract the fragments from the blocks and reconstruct the data from the fragments. In an example, if a Shamir's Secret Sharing (SSS) technique was utilized to fragment the data, then the reconstruction algorithm 914 may utilize the Shamir's Secret Sharing (SSS) technique to reconstruct the data from the fragments. In this way, the data, such as the private key, may be reconstructed at the client device 908 without compromising the data.

Figure 10:
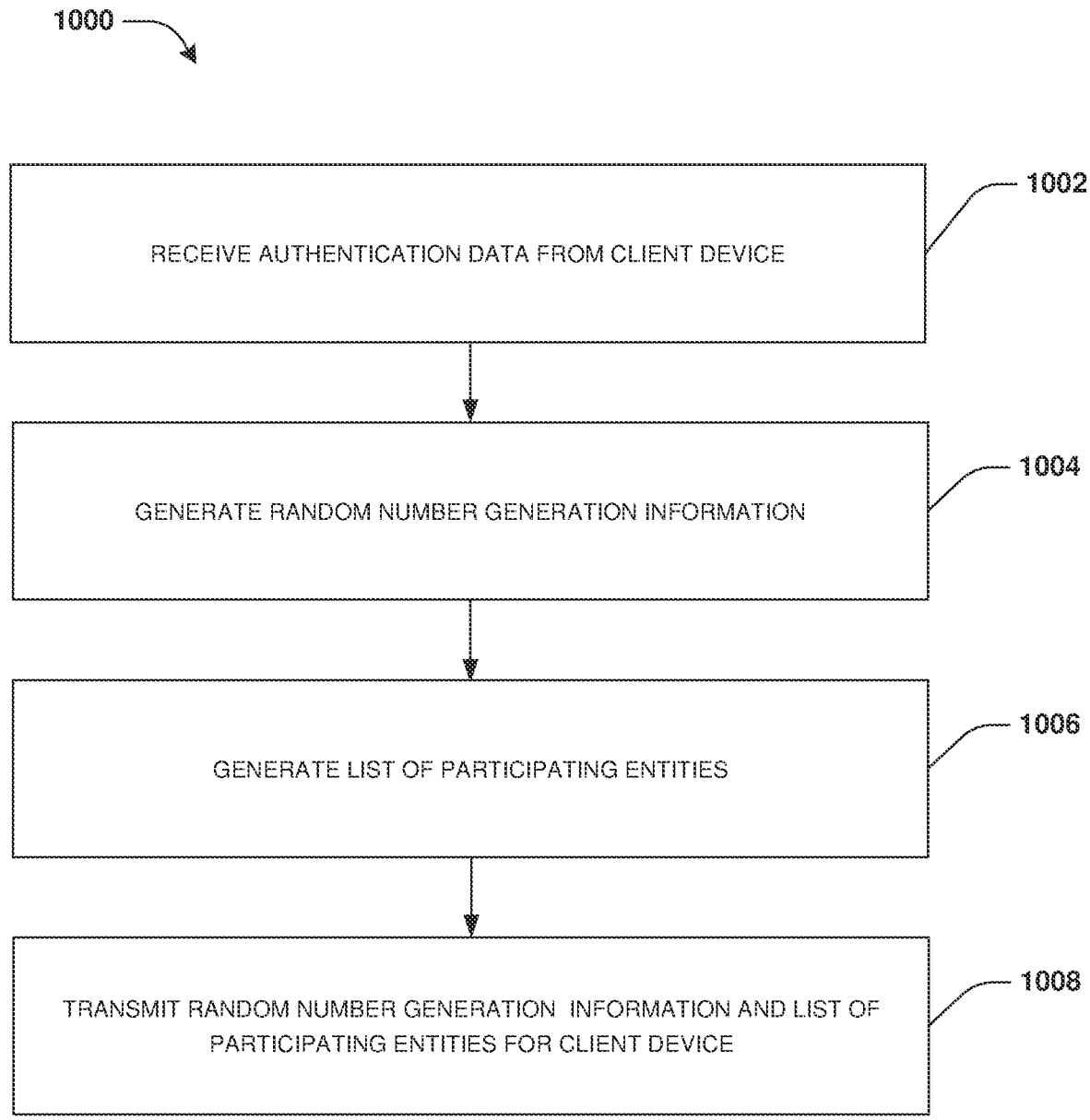
FIG. 10 is a flow chart illustrating an example method for facilitating the fragmentation and/or reconstruction of data.

An embodiment of facilitating the fragmentation and/or reconstruction of data is illustrated by an exemplary method 1000 of FIG. 10. During operation 1002 of method 1000 of FIG. 10, authentication data is received from a client device that is requesting the ability to fragment data stored at the client device for storage across a plurality of entities. In an embodiment, the authentication data is received by a main service. During operation 1004 of method 1000 of FIG. 10, random number generation information is generated in response to the authentication data being successfully authenticated. In an embodiment, the main service may utilize a quantum MEC or other device or component to generate quantum random number generation information as the random number generation information. The random number generation information may indicate a number of fragments into which the data is to be fragmented by the client device. During operation 1006 of method 1000 of FIG. 10, a list of participating entities capable of storing the fragments may be determined. In an embodiment, the main service may determine the list of participating entities. During operation 1008 of method 1000 of FIG. 10, the list of participating entities and/or the random number generation information may be transmitted to the client device, such as by the main service, so that the client device may fragment the data into a set of fragments to store across the participating entities.

In an embodiment, the main service may receive a request from the client device (e.g., the same client device that initially stored and fragmented the data or a different client device) to reconstruct the data from the fragments stored across the participating entities. The request may comprise authentication data. The main service may identify the participating entities at which the fragments are stored. For example, a first block comprising a first fragment may be stored by the main service (e.g., the main service may be a participating entity that stores the first block and/or first fragment), while other fragments may be stored within blocks at other participating entities. The main service may authenticate the authentication data using a signature within the first block. The main service may utilize a random identifier within the first block to identify the algorithm used to generate the random number generation information used for fragmenting the data, and thus the main service can utilize the random number generation information and/or other information such as entity identifier(s) to identify the participating entities. That is, the signature and/or the entity identifier within a block such as the first block may be utilized to authenticate the client device and/or to identify participating entities at which fragments are stored. Accordingly, the main service provides an indication of the participating entities for the client device in response to successfully authenticating the client device so that the client device can retrieve the fragments from the participating entities and reconstruct the data from the fragments. In this way, the data, such as a private key, may be reconstructed without compromising the data.

According to some embodiments, a method is provided. The method includes receiving random number generation information indicating a number of fragments into which data stored by a client device is to be fragmented; fragmenting the data according to the number of fragments as a set of fragments; incorporating authentication data with the set of fragments; identifying a set of entities capable of storing the set of fragments with the authentication data; and storing the set of fragments with the authentication data across the set of entities, wherein a first fragment is stored at a first entity of the set of entities and a second fragment is stored at a second entity of the set of entities.

According to some embodiments, the method includes utilizing a chunking process to create a first block into which the first fragment is stored, wherein the first block comprises the first fragment and at least one of an entity identifier, a block identifier of the first block, a random identifier, a signature corresponding to the authentication data, or padding.

According to some embodiments, the method includes utilizing a chunking process to create a first block associated with the first fragment, wherein the first block comprises a fragment pointer to a location at which the first fragment is stored and at least one of an entity identifier, a block identifier of the first block, a random identifier, a signature corresponding to the authentication data, or padding.

According to some embodiments, the fragment pointer corresponds to at least one of a history of browsed websites, a cookie, a token, or cached data collected by a multi-access edge computing (MEC) device.

According to some embodiments, the location is located within storage of an entity different than the first entity of the set of entities at which the first fragment is stored.

According to some embodiments, the data comprises a private key and the method includes storing the set of fragments of the private key with the authentication data into a plurality of placeholder keys stored across the set of entities.

According to some embodiments, the method includes receiving an entity list specifying the set of entities across which the set of fragments are stored, wherein the entity list is provided in response to successful authentication.

According to some embodiments, the method includes utilizing the entity list to retrieve the set of fragments from the set of entities; and executing a reconstruction algorithm upon the set of fragments to reconstruct the data.

According to some embodiments, the method includes utilizing the reconstruction algorithm to resolve hidden fragments.

According to some embodiments, the method includes utilizing a Shamir's Secret Sharing (SSS) algorithm to fragment the data.

According to some embodiments, utilizing a torrent type mechanism to store the set of fragments across the set of entities.

According to some embodiments, a non-transitory computer-readable medium, storing instructions that when executed perform a method, is provided. The method includes fragmenting data stored by a client device into a set of fragments, wherein the set of fragments comprises a number of fragments specified by random number generation information; incorporating authentication data with the set of fragments to create a set of blocks, wherein a first block comprises the authentication data and a first fragment and a second block comprises the authentication data and a second fragment; identifying a set of entities capable of storing the set of blocks; and storing the set of blocks across the set of entities, wherein the first block is stored at a first entity of the set of entities and the second block is stored at a second entity of the set of entities.

According to some embodiments, the method includes utilizing a plurality of bodyguard accounts as the set of entities, wherein the plurality of bodyguard accounts are hosted across multiple platforms.

According to some embodiments, the storing includes utilizing a steganography technique to hide the set of blocks within one or more images.

According to some embodiments, the set of entities comprises a plurality of accounts such that the storing comprises storing the set of blocks across the plurality of accounts.

According to some embodiments, the storing includes utilizing a superimposition technique to hide the set of blocks within one or more images.

According to some embodiments, the method includes receiving an entity list specifying the set of entities across which the set of blocks are stored, wherein the entity list is provided in response to successful authentication; utilizing the entity list to retrieve the set of blocks from the set of entities; and executing a reconstruction algorithm upon the set of blocks to reconstruct the data.

According to some embodiments, a system is provided. The system comprises a memory comprising instructions; and a processor coupled to the memory, the processor configured to execute the instructions to perform a method. The method includes receiving authentication data from a client device; in response to successfully authenticating the authentication data, generating random number generation information corresponding to a number of fragments into which the client device is to fragment data stored by the client device; generating a list of participating entities across which the fragments are to be stored by the client device; and transmitting the random number generation information and the list of participating entities to the client device.

According to some embodiments, the method includes receiving a request to reconstruct the data utilizing the fragments; identifying the participating entities at which the fragments are stored; and providing an indication of the participating entities in response to successfully authenticating the request.

According to some embodiments, the method includes utilizing at least one of a signature or an entity identifier within a block comprising a fragment to identify a participating entity of the participating entities.

Figure 14:
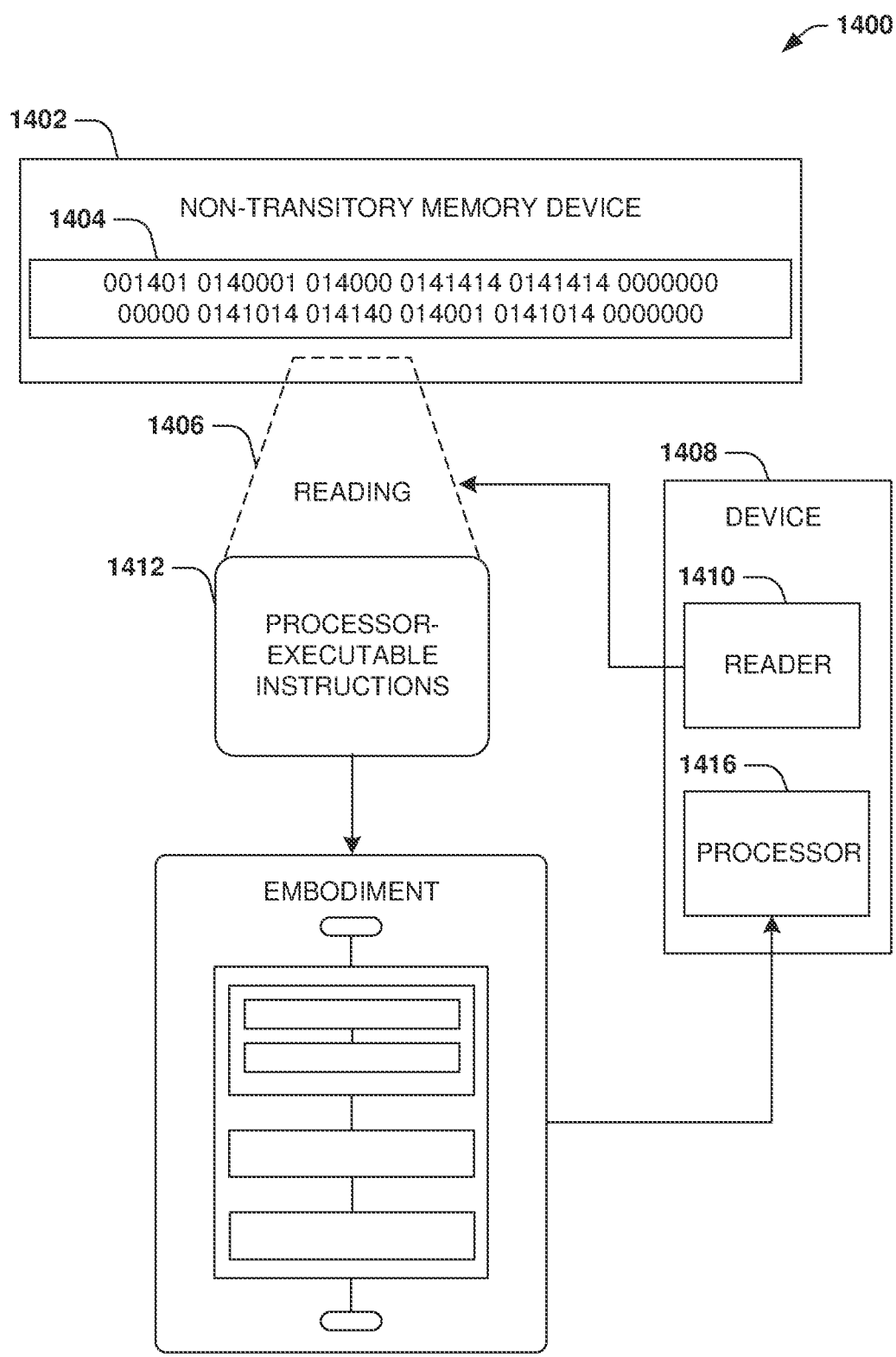
FIG. 14 is an illustration of a scenario featuring an example non-transitory machine readable medium in accordance with one or more of the provisions set forth herein.

FIG. 14 is an illustration of a scenario 1400 involving an example non-transitory machine readable medium 1402. The non-transitory machine readable medium 1402 may comprise processor-executable instructions 1412 that when executed by a processor 1416 cause performance (e.g., by the processor 1416) of at least some of the provisions herein. The non-transitory machine readable medium 1402 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 1402 stores computer-readable data 1404 that, when subjected to reading 1406 by a reader 1410 of a device 1408 (e.g., a read head of a hard disk drive, or a read operation invoked on a solid-state storage device), express the processor-executable instructions 1412. In some embodiments, the processor-executable instructions 1412, when executed cause performance of operations, such as at least some of the example method 400 of FIG. 4, the example method 800 of FIG. 8, and/or the example method 1000 of FIG. 10, for example. In some embodiments, the processor-executable instructions 1412 are configured to cause implementation of a system, such as at least some of the example system 500 of FIG. 5 and/or the example system 900 of FIG. 9, for example.

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering may be implemented without departing from the scope of the disclosure. Further, it will be understood that not all operations are necessarily present in each embodiment provided herein. Also, it will be understood that not all operations are necessary in some embodiments.

Also, although the disclosure has been shown and described with respect to one or more implementations, alterations and modifications may be made thereto and additional embodiments may be implemented based upon a reading and understanding of this specification and the annexed drawings. The disclosure includes all such modifications, alterations and additional embodiments and is limited only by the scope of the following claims. The specification and drawings are accordingly to be regarded in an illustrative rather than restrictive sense. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

What is claimed is:

1. A method comprising:
receiving, by a client device and from a main service, random number generation information specifying a number of fragments into which data stored by the client device is to be fragmented by the client device;
fragmenting, by the client device, the data as a set of fragments according to the number of fragments specified by the main service, wherein the fragmenting comprises the client device creating a first block associated with a first fragment and a second block associated with a second fragment;
incorporating authentication data with the set of fragments;
identifying a set of entities capable of storing the set of fragments with the authentication data; and
storing the set of fragments with the authentication data across the set of entities, wherein the first fragment is stored at a first entity of the set of entities and the second fragment is stored at a second entity of the set of entities.

2. The method of claim 1, wherein
a chunking process is utilized to create the first block and the second block, wherein the first block comprises the first fragment and at least one of an entity identifier, a block identifier of the first block, a random identifier, a signature corresponding to the authentication data, or padding.

3. The method of claim 1, wherein
a chunking process is utilized to create the first block and the second block, wherein the first block comprises a fragment pointer to a location at which the first fragment is stored and at least one of an entity identifier, a block identifier of the first block, a random identifier, a signature corresponding to the authentication data, or padding.

4. The method of claim 3, wherein the fragment pointer corresponds to at least one of a history of browsed websites, a cookie, a token, or cached data collected by a multi-access edge computing (MEC) device.

5. The method of claim 3, wherein the location is located within storage of an entity different than the first entity of the set of entities at which the first fragment is stored.

6. The method of claim 1, wherein the data comprises a private key, and wherein the method comprises:
storing the set of fragments of the private key with the authentication data into a plurality of placeholder keys stored across the set of entities.

7. The method of claim 1, comprising:
receiving an entity list specifying the set of entities across which the set of fragments are stored, wherein the entity list is provided in response to successful authentication.

8. The method of claim 7, comprising:
utilizing the entity list to retrieve the set of fragments from the set of entities; and
executing a reconstruction algorithm upon the set of fragments to reconstruct the data.

9. The method of claim 8, comprising:
utilizing the reconstruction algorithm to resolve hidden fragments.

10. The method of claim 1, wherein the fragmenting comprises:
utilizing a Shamir's Secret Sharing (SSS) algorithm to fragment the data.

11. The method of claim 1, wherein the storing comprises:
utilizing a distributed storage distribution mechanism to distribute the set of fragments across the set of entities.

12. A non-transitory computer-readable medium storing instructions that when executed perform a method comprising:
fragmenting, by a client device, data stored by the client device into a set of fragments, wherein the set of fragments comprises a number of fragments specified by random number generation information received from a main service;
incorporating authentication data with the set of fragments to create, by the client device, a set of blocks, wherein a first block comprises the authentication data and a first fragment and a second block comprises the authentication data and a second fragment;
identifying a set of entities capable of storing the set of blocks; and
storing the set of blocks across the set of entities, wherein the first block is stored at a first entity of the set of entities and the second block is stored at a second entity of the set of entities.

13. The non-transitory computer-readable medium of claim 12, wherein the method comprises:
utilizing a plurality of bodyguard accounts as the set of entities, wherein the plurality of bodyguard accounts are hosted across multiple platforms.

14. The non-transitory computer-readable medium of claim 12, wherein the storing comprises:
utilizing a steganography technique to hide the set of blocks within one or more images.

15. The non-transitory computer-readable medium of claim 12, wherein the set of entities comprises a plurality of accounts such that the storing comprises:
storing the set of blocks across the plurality of accounts.

16. The non-transitory computer-readable medium of claim 12, wherein the storing comprises:
utilizing a superimposition technique to hide the set of blocks within one or more images.

17. The non-transitory computer-readable medium of claim 12, wherein the method comprises:
receiving an entity list specifying the set of entities across which the set of blocks are stored, wherein the entity list is provided in response to successful authentication;
utilizing the entity list to retrieve the set of blocks from the set of entities; and
executing a reconstruction algorithm upon the set of blocks to reconstruct the data.

18. A system comprising:
a processor coupled to memory, the processor configured to execute instructions to perform a method comprising:
receiving authentication data from a client device;
in response to successfully authenticating the authentication data, generating random number generation information specifying a number of fragments into which the client device is to fragment data stored by the client device utilizing a chunking process to create a block associated with each fragment;
generating a list of participating entities across which the fragments are to be stored by the client device; and
transmitting, from a main service, the random number generation information and the list of participating entities to the client device.

19. The system of claim 18, wherein the method comprises:

receiving a request to reconstruct the data utilizing the fragments;

identifying the participating entities at which the fragments are stored; and providing an indication of the participating entities in response to successfully authenticating the request.

20. The system of claim 18, wherein the method comprises:

utilizing at least one of a signature or an entity identifier within a block comprising a fragment to identify a participating entity of the participating entities.

* * * * *